(12) United States Patent
Overgaauw et al.

(10) Patent No.: US 10,406,724 B2
(45) Date of Patent: Sep. 10, 2019

(54) NOZZLE LIFTING ASSEMBLY

(71) Applicant: Ultimaker B.V., Geldermalsen (NL)

(72) Inventors: Peter Rudolf Adriaan Overgaauw, Utrecht (NL); Erik van der Zalm, Eindhoven (NL); Bas Willem van Deursen, Eindhoven (NL); Jan Oosting, Ridderkerk (NL); Marvin Hendrikus Theodorus Timmers, Huis ter Heide (NL)

(73) Assignee: Ultimaker B.V., Geldermalsen (NL)

( * ) Notice: Subject to any disclaimer, the term of this patent is extended or adjusted under 35 U.S.C. 154(b) by 263 days.

(21) Appl. No.: 15/414,668

(22) Filed: Jan. 25, 2017

(65) Prior Publication Data

US 2017/0210033 A1    Jul. 27, 2017

(30) Foreign Application Priority Data

Jan. 27, 2016    (NL) ..................... 2016164

(51) Int. Cl.
| | |
|---|---|
| *B29C 31/04* | (2006.01) |
| *B29C 67/00* | (2017.01) |
| *B33Y 30/00* | (2015.01) |
| *B29C 64/209* | (2017.01) |
| *B29C 64/106* | (2017.01) |
| *B29C 64/20* | (2017.01) |
| *B29C 64/118* | (2017.01) |

(52) U.S. Cl.
CPC .......... *B29C 31/044* (2013.01); *B29C 64/106* (2017.08); *B29C 64/20* (2017.08); *B29C 64/209* (2017.08); *B33Y 30/00* (2014.12); *B29C 64/118* (2017.08)

(58) Field of Classification Search
CPC ..... B29C 31/044; B29C 64/20; B29C 64/106; B29C 64/118; B33Y 30/00
See application file for complete search history.

(56) References Cited

U.S. PATENT DOCUMENTS

| | | | |
|---|---|---|---|
| 5,503,785 A | 4/1996 | Crump et al. | |
| 2007/0228590 A1* | 10/2007 | LaBossiere | B33Y 30/00 264/40.1 |
| 2009/0035405 A1* | 2/2009 | Leavitt | B28B 1/14 425/97 |
| 2010/0021580 A1* | 1/2010 | Swanson | B29C 31/042 425/132 |
| 2012/0164256 A1* | 6/2012 | Swanson | B29C 41/52 425/162 |
| 2014/0242208 A1* | 8/2014 | Elsworthy | B29C 31/042 425/375 |

(Continued)

*Primary Examiner* — Anthony Calandra
*Assistant Examiner* — Jerzi H Moreno Hernandez
(74) *Attorney, Agent, or Firm* — N.V. Nederlandsch Octrooibureau; Catherine A. Shultz; Tamara C. Stegmann

(57) ABSTRACT

A nozzle lifting assembly for an additive manufacturing system includes a base member and a lift member relatively movable with respect thereto, a first nozzle body arranged for being lifted by the lift member and a second nozzle body disposed on the base member. A wedge member is movably arranged relative to the base member and in wedging engagement with the lift member between a first and second wedge position, wherein the first and second wedge position correspond to a lowered position and a lifted position of the first nozzle body with respect to the second nozzle body, respectively.

15 Claims, 9 Drawing Sheets

(56) References Cited

U.S. PATENT DOCUMENTS

2015/0290861 A1  10/2015  Douglass et al.
2016/0121535 A1* 5/2016  Li ........................ B29C 64/209
                                                          425/131.1
2016/0135587 A1* 5/2016  Satou ...................... A47B 9/10
                                                          108/143
2016/0185042 A1* 6/2016  Toh ........................ B29C 64/20
                                                          425/132

* cited by examiner

NOZZLE LIFTING ASSEMBLY

FIELD OF THE INVENTION

The present invention relates to a nozzle lifting assembly, in particular to a nozzle lifting assembly for an additive manufacturing system.

BACKGROUND

U.S. Pat. No. 5,503,785 discloses an apparatus and process for making three-dimensional objects of a predetermined shape. The apparatus comprises a first dispensing head which is mounted for relative movement with respect to a second dispensing head so as to be able to deposit material in multiple passes and layers to form an object of a predetermined shape. The first dispensing head may be connected to a lift device, such as a hydraulic fluid cylinder or a spring loaded solenoid for providing relative movement of the first dispensing head with respect to the second dispensing head.

US patent application US 2015/0290861 A1 discloses a barrel for use in an additive manufacturing machine comprising a sleeve extending along a longitudinal axis; a conduit extending along the longitudinal axis through the sleeve; and an actuating system associated with the sleeve, wherein the actuating system is configured to move the conduit along the longitudinal axis relative to the sleeve between a first position and a second position. The barrel further comprises a nozzle associated with the conduit, wherein the nozzle is movable with the conduit relative to the sleeve between the first position and the second position. In an embodiment the actuating system may comprise a solenoid actuator or a servo actuator.

SUMMARY

The present invention seeks to provide a nozzle lifting assembly for an additive manufacturing system having an improved reproducibility of positional changes between a first and second nozzle during operation of the nozzle lifting assembly. In particular, the nozzle lifting assembly provides accurate and reproducible height changes of the first nozzle with respect to the second nozzle, wherein the reproducibility of height changes is more robust against e.g. wear between components of the nozzle lifting assembly, temperature changes during nozzle extrusion processes as well as pollution of component over extended periods of time.

According to the present invention, a nozzle lifting assembly of the type defined in the preamble is provided, wherein the nozzle lifting assembly comprises a base member and a lift member relatively moveable with respect thereto, a first nozzle body disposed on the lift member and a second nozzle body disposed on the base member, and wherein a wedge member is movably arranged on the base member and in wedging engagement with the lift member between a first and second wedge position, wherein the first and second wedge position correspond to a lowered position and a lifted position of the first nozzle body with respect to the second nozzle body, respectively.

The wedging engagement between the wedge member and the lift member allows the nozzle lifting assembly of the present invention to reliably reproduce a lifted and a lowered position of the first nozzle body with respect to the second nozzle body, so that switching, e.g. activation/deactivation, between the first and the second nozzle body during additive manufacturing processes remains accurate for many lifting cycles and hours of use of the nozzle lifting assembly.

SHORT DESCRIPTION OF DRAWINGS

The present invention will be discussed in more detail hereinafter based on a number of exemplary embodiments with reference to the drawings, in which FIG. 1 shows an embodiment of a nozzle lifting assembly in a lifted position according to the present invention;

FIGS. 3 and 4 shows a three dimensional view of an embodiment of a base member, lift member and wedge member;

DETAILED DESCRIPTION

Figure 1:
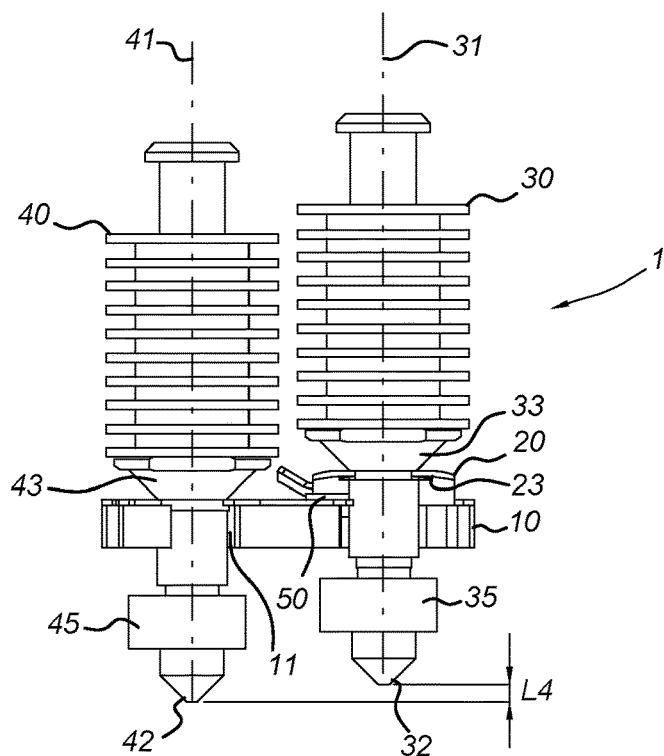
Figure 2:
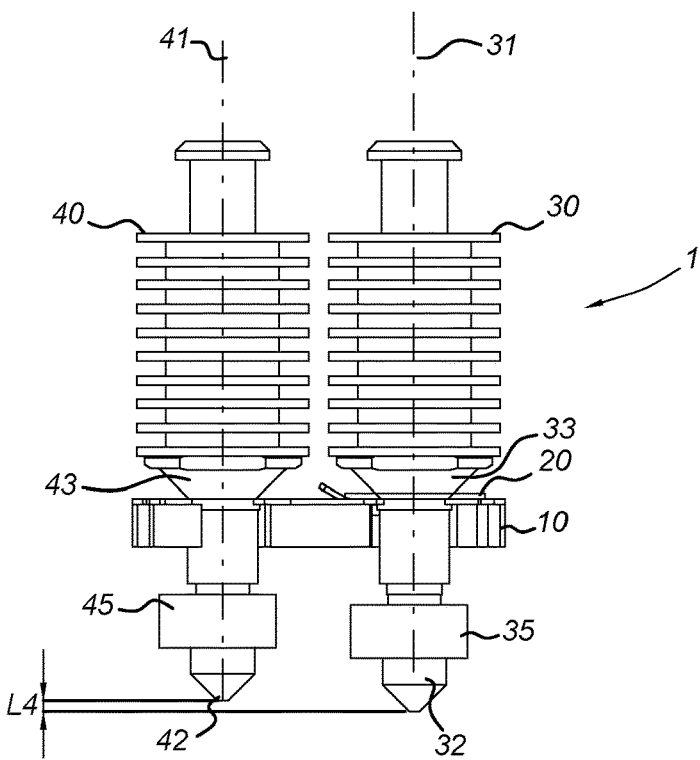
FIG. 2 shows an embodiment of a nozzle lifting assembly in a lowered position according to the present invention.

FIGS. 1 and 2 each show an embodiment of a nozzle lifting assembly in a lifted position and a lowered positioned, respectively, according to the present invention. In the embodiments shown, the nozzle lifting assembly 1 comprises a base member 10 and a lift member 20 relatively moveable with respect to the base member 10, wherein a first nozzle body 30 is disposed on the lift member 20 and a second nozzle body 40 is disposed on the base member 20. Further, a wedge member 50 is provided that is movably arranged on the base member 10 and in wedging engagement with the lift member 20 between a first and second wedge position. The first and second wedge position correspond to a lowered position and a lifted position of the first nozzle body 30 with respect to the second nozzle body 40, respectively. That is, FIG. 1 depicts the second wedge position of the wedge member 50, wherein the first nozzle body 30 is in a lifted position with respect to the second nozzle body 40, and where FIG. 2 depicts the first wedge position, wherein the first nozzle body 30 is in a lowered position with respect to the second nozzle body 40.

In an embodiment, the nozzle lifting assembly 1 further comprises a nozzle heating unit in heating engagement with the first and second nozzle body 30, 40 so as to heat extrusion material as it travels through the first and/or second nozzle body 30, 40 during an additive manufacturing cycle. The heating unit may comprise a separate nozzle heater for each nozzle, e.g. a first nozzle heater 35 in heating engagement with the first nozzle body 30 and a second nozzle heater 45 in heating engagement with the second nozzle body 45.

In contrast to prior art nozzle lifting assemblies, the nozzle lifting assembly 1 of the present invention allows for high reproducibility of the lifted and lowered position of the first nozzle body 30 with respect to the second nozzle body 40. The wedging engagement between the wedge member 50 and lift member 20 not only ensures that an accurate lifted and lowered position of the first nozzle body 30 is achieved, but the accuracy is reproducible over many lifting cycles during additive manufacturing. It is determined that more than 750.000 reproducible lifting cycles are possible, so wherein the first nozzle body 30 moves from a lifted to a lowered position or via versa. In advantageous embodiments, the lifted and lowered position of the first nozzle body 30 with respect to the second nozzle body 40 may be accurate up to +/−0.05 mm along a path of displacement between the lifted and lowered position, wherein the path of displacement between the lifted and lowered position may be envisaged as being substantially linear.

To clarify the above further, in an embodiment the first and second nozzle body 30, 40 each comprise a longitudinal axis 31, 41 that is substantially perpendicular to the base member 10. The first and second nozzle body 30, 40 each comprise an extrusion outlet 32, 42 exhibiting a positional difference Lh, e.g. a height difference, along the longitudinal axis 31 of the first nozzle body 30 in the lifted or lowered position thereof. In an advantageous embodiment the positional or height difference Lh is about 0.8 mm to 1.2 mm, e.g. 1 mm. In a further advantageous embodiment the positional or height difference Lh is about 0.8 mm to 1.2 mm, e.g. 1 mm, with an accuracy of at least +/−0.1 mm, e.g. +/−0.08, e.g. +/−0.06, e.g. +/−0.04 mm.

As depicted in the embodiments of FIGS. 1 and 2, the extrusion outlet 32 of the first nozzle body 30 is positioned lower than an extrusion outlet 42 of the second nozzle body 40 in the first wedge position, and wherein the extrusion outlet 32 of the first nozzle body 30 is positioned higher than the extrusion outlet 42 of the second nozzle body 40 in the second wedge position. This avoids interference between the first and second nozzle bodies if one of them is actively extruding material and the other nozzle is momentarily idle. As shown, the positional or height difference Lh between the extrusion outlet 32 of the first nozzle body 30 and the extrusion outlet 42 of the second nozzle body is about 0.8 mm to 1.2 mm, e.g. 1 mm, thereby providing sufficient clearance between the first or second nozzle body 30, 40 and a layer being deposited.

In view of the invention, the lift member 20 and wedge member 50 ensure that the positional or height difference Lh is mechanically guaranteed as no electronic control and regulation is necessary to achieve and maintain accurate positioning of the first nozzle body 30 in the lifted or lowered position. That is, positioning accuracy is by and large dependent on dimensional accuracy and precise manufacturing of the lift member 20 and wedge member 50, keeping manufacturing tolerances to a minimum, so that the wedging engagement is accurate and precise. The positional or height difference Lh therefore correlates with a size of the wedge member, such as a wedge thickness profile thereof.

Figure 3:
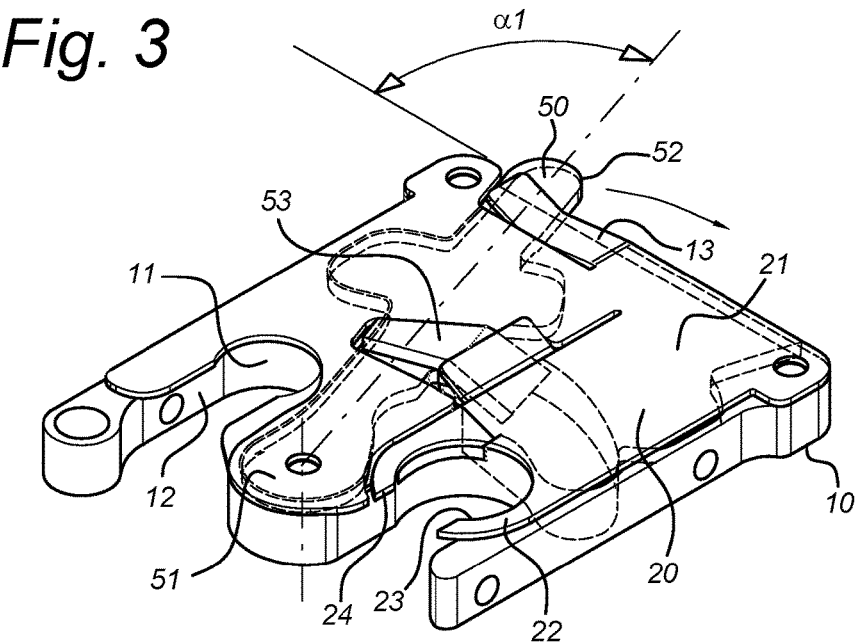
Figure 4A:
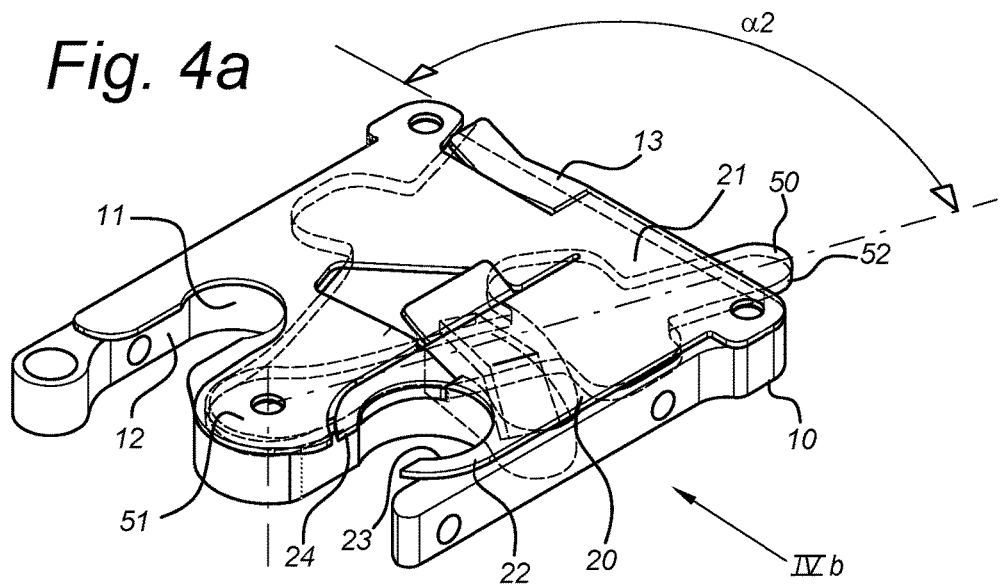
FIG. 4a shows three dimensional view of an embodiment of a base member, lift member and wedge member in a wedged arrangement.

FIG. 3 shows a three dimensional view of an embodiment of a base member 10, lift member 20 and wedge member 20 in the first wedge position, whereas FIG. 4a depicts a three dimensional view of an embodiment of a base member 10, lift member 20 and wedge member 50 in the second wedge position.

In the embodiments shown, the lift member 20 comprises a first end 21 in rotational engagement with the base member 10 and a second end 22 in contact engagement with the first nozzle body 6. Note that the first nozzle body 30 is not shown for clarity.

The rotational engagement of the first end 21 of the lift member 20 with the base member 10 allows for a displacement of the second end 22 of the first nozzle body 30 to a lowered position of the first nozzle body 30 as well as a displacement to the lifted position of the first nozzle body 30. The positional or height difference Lh as mentioned above may be adjusted as required by choosing a suitable distance between the first and second end 21, 22. For example, increasing a linear distance between the first and second end 21, 22 allows for an increased displacement of the first nozzle body 30 from the lowered to the lifted position or vice versa. Of course, in another embodiment, increasing e.g. a thickness profile of the wedge member 50 allows for a larger displacement of the first nozzle body 30 between the lowered and lifted position thereof. In an embodiment the wedge member 50 is in wedging engagement between the first and second end 21, 22 of the lift member 20, allowing for a rotational motion of the lift member 20 when in wedging engagement therewith without inferring with the first nozzle body 30, which is arranged at the second end 22 thereof.

In an embodiment, the lift member 20 may comprise a flat or planar like shape arranged substantially parallel to the base member 10 in the first wedge position and arranged at an angle to the base member 10 in the second wedge position. The flat or planar shape of the lift member 20 allows for a compact design over a given rotational angle between the first and second wedge position.

In an embodiment, the rotational engagement between the lift member 20 and base member 10 may exhibit resiliency, so that the rotational engagement comprises a biasing arrangement imposing an associated biasing rotational force or torque on the lift member 20, wherein the second end 22 of the lift member 20 is biased to move to the lowered position when the wedge member 50 moves from the second to the first wedge position. As such, the resiliency of the rotational engagement facilitates a displacement from the lifted position toward the lowered position of the first nozzle body 30 when the wedge member 50 moves from the second to the first wedge position. The rotational engagement between the lift member 10 and the base member 10 may be embodied in various ways. In an exemplary embodiment, the first end 21 of the lift member 20 may be resiliently connected to the base member 10, thereby defining a biasing arrangement there between imposing a biasing torque onto the lift member 20.The resilient connection may be further embodied by the lift member 20 being a planar, pliable lift member 20, wherein the first end 21 thereof is rigidly connected to the base member 10. In an embodiment, the first end 21 of the lift member 20 is integrated with the base member 10 and/or the lift member 20 itself is integrated with the base member 10, i.e. in an embodiment the base member 10 and lift member 20 may comprise a one piece component, reducing the number of components used for the nozzle lifting assembly as well as associated costs.

Referring to the FIGS. 1 to 3 and 4a, in the embodiments depicted the first nozzle body 30 may comprise a conical section 33 extending through a lift member hole 23 in the second end 22 of the lift member 20 and the second nozzle body 40 may comprise a conical section 43 extending through a base member hole 11 in the base member 10, wherein the conical section 33 of the first nozzle body 30 and the conical section 43 of the second nozzle body 40 are in circumferential contact engagement with, respectively, the lift member hole 23, e.g. a circumferential rim thereof, and the base member hole 11, e.g. a circumferential rim thereof. It is important to note that the circumferential contact engagement may be envisaged as a line or point contact engagement between the conical section 33, 43 of the first and second nozzle body 30, 40 and the lift member hole 23 and base member hole 11.

The conical section 33, 43 of the first and second nozzle body 30, 40 are advantageous as a laterally centred alignment of the first and second nozzle body 30, 40 is guaranteed with respect to the lift member hole 23 and base member hole 10. Consequently, lateral positioning of the first and second nozzle body 30, 40, in particular their respective extrusion outlets 32, 42, is highly accurate and reproducible over many lifting cycles. For example, the conical section 33 of the first nozzle body 30 and conical section 43 of the second nozzle body 40 allow for a centred engagement with the lift member hole 23 and base member hole 11, respectively. This yields an exemplary embodiment wherein lateral positioning accuracy of the first and second nozzle body 30, 40, i.e. the respective extrusion outlets 32, 42 thereof, is at least 0.08 mm, e.g. 0.05 mm, e.g. 0.02 mm.

Naturally, the more accurate the conical sections 33, 43 and lift member hole 23 and base member hole 11 are manufactured, the higher the lateral positioning accuracy will be. Moreover, not only lateral positioning is highly accurate as mentioned above, but also longitudinal positioning of the first and second nozzle body 30, 40 is facilitated by the conical sections 33, 43, the lift member hole 23 and based plate hole 11. In an exemplary embodiment, longitudinal positioning accuracy of the first and second nozzle body 30, 40, i.e. the respective extrusion outlets 32, 42 thereof, is at least 0.08 mm, e.g. 0.05 mm, e.g. 0.02 mm.

An important requirement and advantage of the nozzle lifting assembly 1 of the present invention is ease of use and, in particular, allowing convenient replacement of the first and second nozzle body 30, 40 whenever necessary. To that end an embodiment is provided wherein the lift member 20 and base member 10 each comprise a side opening 24, 12 extending toward the lift member hole 23 and base member hole 11, respectively. From a user point of view the side opening 24 of the lift member 20 and side opening 12 of the base member 10 enables fast and convenient removal and placement of a new nozzle body if so required. The first and second nozzle body 30, 40 only need a lateral approach and retrieval, wherein the conical sections 33, 34 disclosed above guarantee accurate alignment to 0.08 mm or even less when in contact engagement with the associated lift member hole 23 and base member hole 11. Hence, the user need not accurately place the first and/or the second nozzle body 30, 40 within the nozzle lifting assembly 1 as alignment is guaranteed.

As disclosed hereinabove, the wedge member 50 is movably arranged on the base member 10 and in wedging engagement with the lift member 20 between a first and second wedge position, wherein the first and second wedge position correspond to a lowered position and a lifted position of the first nozzle body 30 with respect to the second nozzle body 40, respectively. In view of the invention, in an embodiment the wedge member 50 may be linearly movable with respect to the base member 10 between the first and second wedge position. In an alternative advantageous embodiment, such as depicted in FIGS. 3 and 4a, the wedge member 50 is pivotally arranged on the base member 10 between a first pivot angle ($\alpha 1$) and a second pivot angle ($\alpha 2$). This embodiment provides secure connection of the wedge member 50 to the base member 10 yet allow the wedge member 50 to move along the base member 10 for wedging engagement between the base member 10 and the lift member 20.

In an embodiment the wedge member 50 comprises a first end 51 pivotally connected to the base member 10 and a wedge portion 53 arranged at a distance from the first end 51 of the wedge member 50. The wedge portion 53 thus moves along a substantially circular path between the first and second pivot angle ($\alpha 1$, $\alpha 2$). The distance of the wedge portion 53 to the first end 51 determines an angle range over which the contact engagement occurs between the wedge member 50 and the lift member, which angle range may comprise an entire angle range between the first and second pivot angle ($\alpha 1$, $\alpha 2$). The wedge portion 53 may be embodied as a local protrusion having a wedge engagement surface for sliding engagement along a corresponding wedge engagement surface of the lift member 20. In a further embodiment the wedge portion 53 may even be embodied as a roller element for rolling engagement with a wedge engagement surface of the lift member 20, wherein the roller element reduces friction forces etc.

In an embodiment, the base member 10 comprises a locking member in locking engagement with the wedge member 50 in the first wedge position. This embodiment is advantageous in case use is made of a biasing force arrangement for moving the wedge member 50 from the first wedge position to the second wedge position, i.e. from the first pivot angle ($\alpha 1$) to the second pivot angel ($\alpha 2$), wherein the biasing force arrangement imposes a constant force or torque onto the wedge member 50 in the direction from the first to the second wedge position. In an exemplary embodiment of the biasing force arrangement, a spring unit may be connected to the base member 10 and the wedge member 50, wherein the spring unit is under tension or compression in the first wedge position.

Figure 4B:
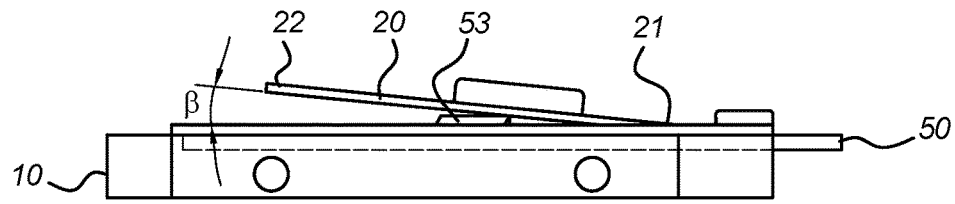
FIG. 4b shows side view of an embodiment of a base member, lift member and wedge member in a wedged arrangement.

FIG. 4b shows a side view of an embodiment of a base member 10, a lift member 20 and a wedge member 50 in a wedged arrangement. The depicted embodiment corresponds to a side view in the direction of line IV b in FIG. 4a. In the embodiment the lift member 20 is in wedging engagement with the wedge member 50, in particular the wedge portion 53, in the second wedge position. The wedge portion 53 engages the lift member 20 between the first end 21 and second end 22 thereof. As the lift member 20 is attached to the base member 10 and in rotational engagement therewith, the second end of the lift member 20 is displaced in the longitudinal direction of the longitudinal axis 31 as shown in FIGS. 1 and 2, thus providing the position or height displacement Lh for the first nozzle body 30 as desired. In the second wedge position the lift member 20 is at a lift angle ($\beta$) with respect to the base member 10. The lift angle ($\beta$) may be adapted, hence the height displacement Lh, by arranging the wedge portion 53 closer to the first or second end 21, 22 of the lift member 20. As such the positional or height displacement can be accurately designed as required for particular applications, thereby guaranteeing sufficient clearance between the extrusion outlet 32 of the first nozzle body 30 and the extrusion outlet 42 of the second nozzle body 40 during an additive manufacturing process.

Figure 5A:
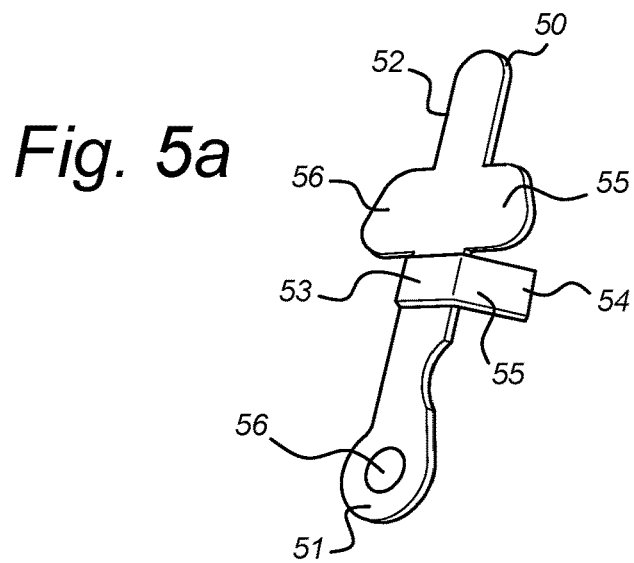
FIG. 5a shows an embodiment of a wedge member as used in the present invention.

FIG. 5a shows an embodiment of a wedge member 50 as used in the present invention. In the embodiment shown the wedge member 50 comprises the first end 51 and a second end 52 having there between a wedge portion 53 for wedging engagement with the lift member 20. In an embodiment, the wedge member 50 may comprise a pivot hole arranged at the first end 51 for pivotally connecting the wedge member 50 to the base member 10, thereby allowing the wedge portion 53 to move along the base member 10 from the first wedge position to the second wedge position.

In a further embodiment, the wedge member 50, e.g. the wedge portion 53, comprises a ramp section 54 in sliding engagement with the lift member 20. The ramp section 54 improves wedging and facilitates displacement of the lift member 20 between the lowered and lifted position thereof. The ramp section 54 also reduces friction forces between the wedge member 50 and the lift member 20, allowing for smaller forces or torques for moving the wedge member 50 from the first to the second wedge position or vice versa.

In the exemplary embodiment as depicted in FIG. 5a, the wedge member 50 may comprise a wedge portion 53 embodied as a projection for wedging engagement with the lift member 20. To facilitate wedging and to e.g. reduce wedging forces, the wedge portion 53 may comprises a ramp section 54 as mentioned earlier. In a particular embodiment the ramp section 54 comprises a projected ramp surface 55, which, when in wedging engagement with the lift member 20, imposes a moment onto the wedge member 50 around a longitudinal axis thereof. To absorb this moment, in an embodiment the wedge member 50 may comprises a planar stabilizing section 56 substantially parallel to the base member 10 and slidingly arranged thereon. The planar stabilizing section 56 prevents longitudinal rotation of the wedge member 50 when the projected ramp surfaces 5656 is in contact engagement with the lift member 20. As a result, any moments imposed on the first end 51 of the wedge member 50 are eliminated, thereby protecting, for example, a pivot connection between the wedge member 50 and the base member 10. In case the pivot connection utilizes a plain bearing or ball bearing, for example, the planar stabilizing section 56 ensures that the pivot connection is subjected to radial forces only.

Figure 5B:
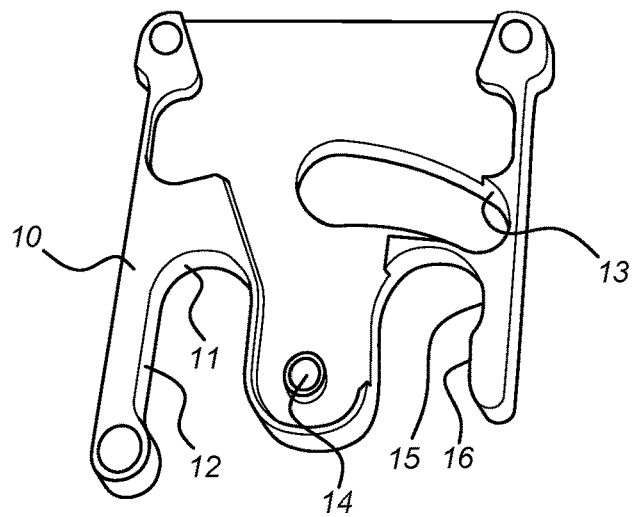
FIG. 5b shows an embodiment of a base member as used in the present invention.

FIG. 5b shows an embodiment of a base member 10 as used in the present invention. In the embodiment shown the base member 10 comprises a side opening 12 extending toward a base member hole 11 for accommodating the second nozzle body 40 As mentioned hereinabove, the side opening 12 allows for convenient lateral placement or removal of a nozzle body, i.e. the second nozzle body 40. In a further embodiment, the base member 10 may also comprise a further base member hole 15 and further side opening 16, which also provide convenient lateral removal or placement of a further nozzle body, i.e. the first nozzle body 30.

In an embodiment, the base member 10 comprises a pivot member 14 for pivotal engagement with the wedge member 50. The pivot member 14 may comprise a plain bearing, a roller bearing and the like, but it may also comprise a plain shaft member extending through the pivot hole 56 as shown in FIG. 5a.

As mentioned above, the wedge member 50 may comprise a ramp section 54 having a projected ramp surface 54 arranged to come into contact with the lift member 20 when the wedge member 50 moves along the base member 10. To facilitate wedging, the ramp section 54, in particular the projected ramp surface 55 thereof, may be disposed at an angle to allow for smooth wedging, hence smooth lifting of the lift member 20. As the wedge member 50 and the wedge section 53 move along the base member 10 during a lifting cycle, an embodiment is provided wherein the base member 10 comprises a wedge section recess 13, wherein the wedge member 50 extends at least in part into the wedge section recess 13. In a further embodiment, the wedge section 53 of the wedge member 50 extends at least in part in the wedge section recess 13. The wedge section recess 13 is operable to receive at least in part the wedge section 53, e.g. the ramp section 54 thereof, to minimize the size of the nozzle lifting assembly 1, in particular a height or thickness of the base member 10 and wedge member 50 disposed thereon.

Figure 5C:
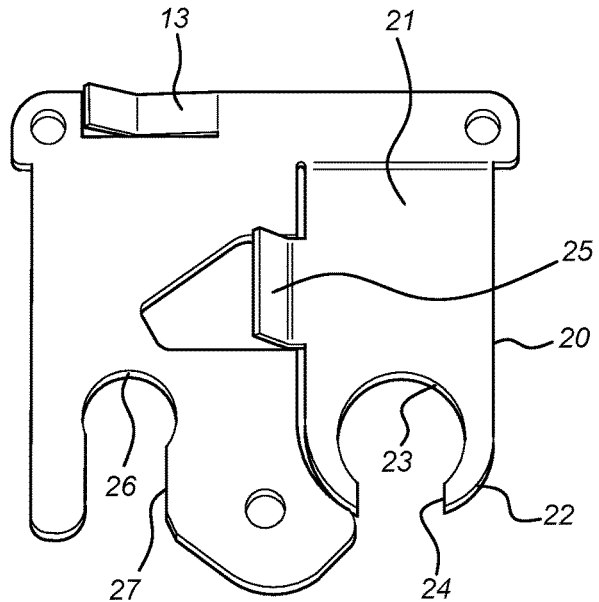
FIG. 5c shows an embodiment of a lift member as used in the present invention.

FIG. 5c shows an embodiment of a lift member 20 as used in the present invention. In the embodiment shown the lift member 20 comprises a first end 21 and a second end 22, wherein the second end 22 comprises the lift member hole 23 and the side opening 24. The side opening 24 facilitates convenient lateral placement and removal of a nozzle body, i.e. the first nozzle body 30. In an embodiment, the lift member 20 further comprises a wedge section 25 in wedging engagement with the wedge member 50. The wedge section 25 of the lift member 25 may be disposed at an angle substantially equal to an angle of the wedge section 53 of the wedge member 50. Both angles may be adapted so as to provide smooth wedging by reducing friction forces.

In an embodiment, the lift member 20 comprises a further lift member hole 26 and a further side opening 27. The further side opening 27 allows convenient removal or placement of a nozzle body, e.g. the second nozzle body 40.

Figure 6A:
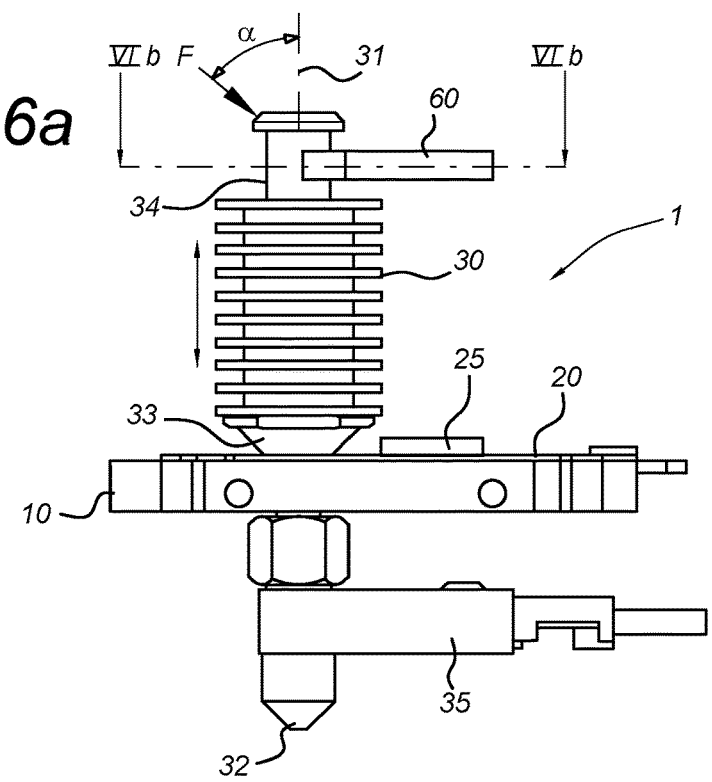
FIG. 6a shows a side view of a lateral alignment member as used in the present invention.

FIG. 6a shows a side view of a nozzle lifting assembly according to the present invention, in particular a lateral alignment member as used in the nozzle lifting assembly. In the embodiment shown, the nozzle lifting assembly 1 comprises a lateral alignment member 60 in sliding engagement with an inlet end 34 of the first nozzle body 30. The alignment member 60 ensures that the first nozzle body 30 and its longitudinal axis 31 remain substantially perpendicular to the base member 10 when the first nozzle assembly 30 is in the lowered or lifted position. In the depicted embodiment the first nozzle body 30 is in the lowered position, wherein the lift member 20 is embodied as a flat plate lift member arranged substantially parallel to the base member 10 in the first wedge position. The conic section 33 of the first nozzle body 30 extends through the lift member hole 23 and is in circumferential contact engagement therewith, thereby guaranteeing lateral as well as longitudinal positioning accuracy of the first nozzle body 30 and the extrusion outlet 32 thereof with respect to the second nozzle body 40 and the extrusion outlet 42 thereof.

In an embodiment, the nozzle lifting assembly 1 further comprises a positioning unit imposing a positioning force F as indicated FIG. 6a on the first nozzle body 30 and inlet end 34 thereof. In particular, a positioning unit may be provided in contact engagement with the inlet end 34 of the first nozzle body 30, wherein the positioning unit is configured to provide a downward positioning force in the longitudinal direction 31 and a lateral positioning force onto the first nozzle body 30. The downward positioning force acting upon the first nozzle body 30 ensures that the conic section 33 is pressed downward against an edge of the lift member hole 23 as it extends there through, and wherein the lateral positioning force ensures that the inlet end 34 of the first nozzle body 30 is positioned against the alignment member 60. As a result, the first nozzle body 30 remains accurately aligned in three dimensions with respect to the base member 10, the second nozzle body 40 and the extrusion outlet 42 thereof. In an embodiment the downward positioning force may be between 10 N to 20 N.

Figure 6B:
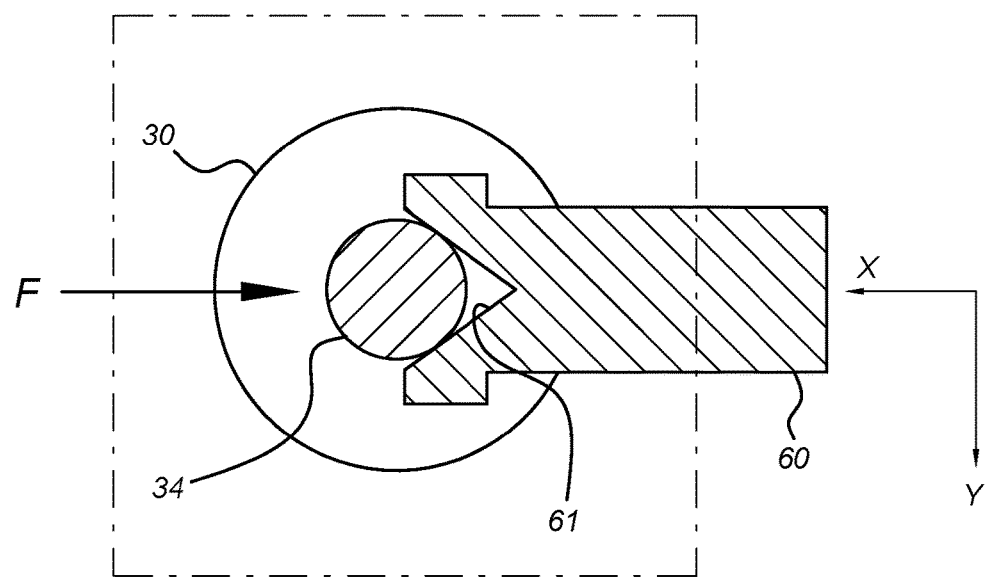
FIG. 6b shows a top view of a lateral alignment member as used in the present invention.

FIG. 6b shows a top view of a lateral alignment member as used in the present invention. In the embodiment shown, the lateral alignment member 60 is in contact engagement with the inlet end 34 of the first nozzle body 30, ensuring lateral positioning accuracy in the indicated X and Y directions of the nozzle body 30 and the inlet end 34 thereof. As mentioned earlier, in a further embodiment a positioning unit may be provided imposing a positioning force F onto the first nozzle body 30, such as a longitudinal force (e.g. downward) as well as a lateral force (e.g. sideways) onto the first nozzle body 30. In an advantageous embodiment, the lateral alignment member 60 comprises a v-shaped recess 61. The V-shaped recess allows contact engagement between the inlet end 34 of the first nozzle body 30 and the lateral alignment member 60, wherein the first nozzle body 30 remains movably arranged with respect to the alignment member 60 for lifting motion of the first nozzle body 30 (e.g. upward, downward). In an exemplary embodiment the positioning unit provides a lateral force for ensuring the first end 34 of the first nozzle body 30 is firmly arranged within the V-shaped recess and against the lateral alignment member 60, ensuring lateral positioning accuracy in the depicted X and Y directions.

To facilitate motion of the first nozzle body 30 between the lifted and lowered potions thereof during an additive manufacturing cycle, the lateral alignment member 60 may be of a plastic material. In a further embodiment, the lateral alignment member 60 may comprise a coating, such as a PTFE ("Teflon") coating. The plastic material of the lateral alignment member 60 reduces friction forces during lifting cycles of the first nozzle body 30, wherein a coating on the lateral alignment member 60 may contribute to a further reduction of friction forces when the first nozzle body 30 is firmly arranged against the lateral alignment member 60.

In view of the lateral alignment member 60 and positioning unit as described above, the second nozzle body 40 may also be in contact engagement with the lateral alignment member 60 in a manner similar to the first nozzle body 30. That is, the positioning unit may also subject the second nozzle body 40 to a downward positioning force in longitudinal direction 41 of the second nozzle body 40 as well as a lateral positioning force. The downward positioning force ensures that the conic section 43 of the second nozzle body 40 is firmly arranged against an edge of the base member hole 11, and the lateral positioning force ensures firm contact engagement of an inlet end of the second nozzle body 40 with the lateral alignment member 60. As a result, three dimensional positioning accuracy of the second nozzle body 40 and the extrusion outlet 42 thereof is guaranteed with respect to the base member 10, the first nozzle body 30 and the extrusion outlet 32 thereof.

With reference to FIGS. 3, 4a, 5b and 5c, it is important to note that in alternative embodiments the base member 11 and the lift member 20 may be integrated into a one-piece component or may be separate component of the nozzle lifting assembly 1. In case the base member 10 and the lift member 20 are integrated, then the base member hole 11 and side opening 12 of the base member 10 may coincide with the further lift member hole 26 and further side opening 27 of the lift member 20.

In any embodiment, however, accurate alignment in three dimensions between the first and second nozzle body 30, 40 and extrusion outlets 32, 42 thereof is guaranteed by the conical sections 33, 43. That is, the conical section 33 of the first nozzle body 30 is in contact engagement with the lift member hole 23 and the second nozzle body 40 is in contact engagement with an edge of the base member hole 11 or further lift member hole 27.

In light of the present invention it is further noted that the first nozzle body 30 may comprise the lift member 20, thus wherein the lift member 20 is fixedly attached to the first nozzle body 30 and the wedge member 50 is in wedging engagement with the lift member 20 between the first and second wedge position. In an exemplary embodiment, the lift member 20 may be embodied as a local protrusion or projection of the first nozzle body 30 in e.g. sliding engagement with the wedge member 50 between the lowered and lifted position of the first nozzle body 30.

The nozzle lifting assembly 1 of the present invention may be implemented alternatively as the further embodiments as shown in the FIGS. 7 to 11.

Figure 7:
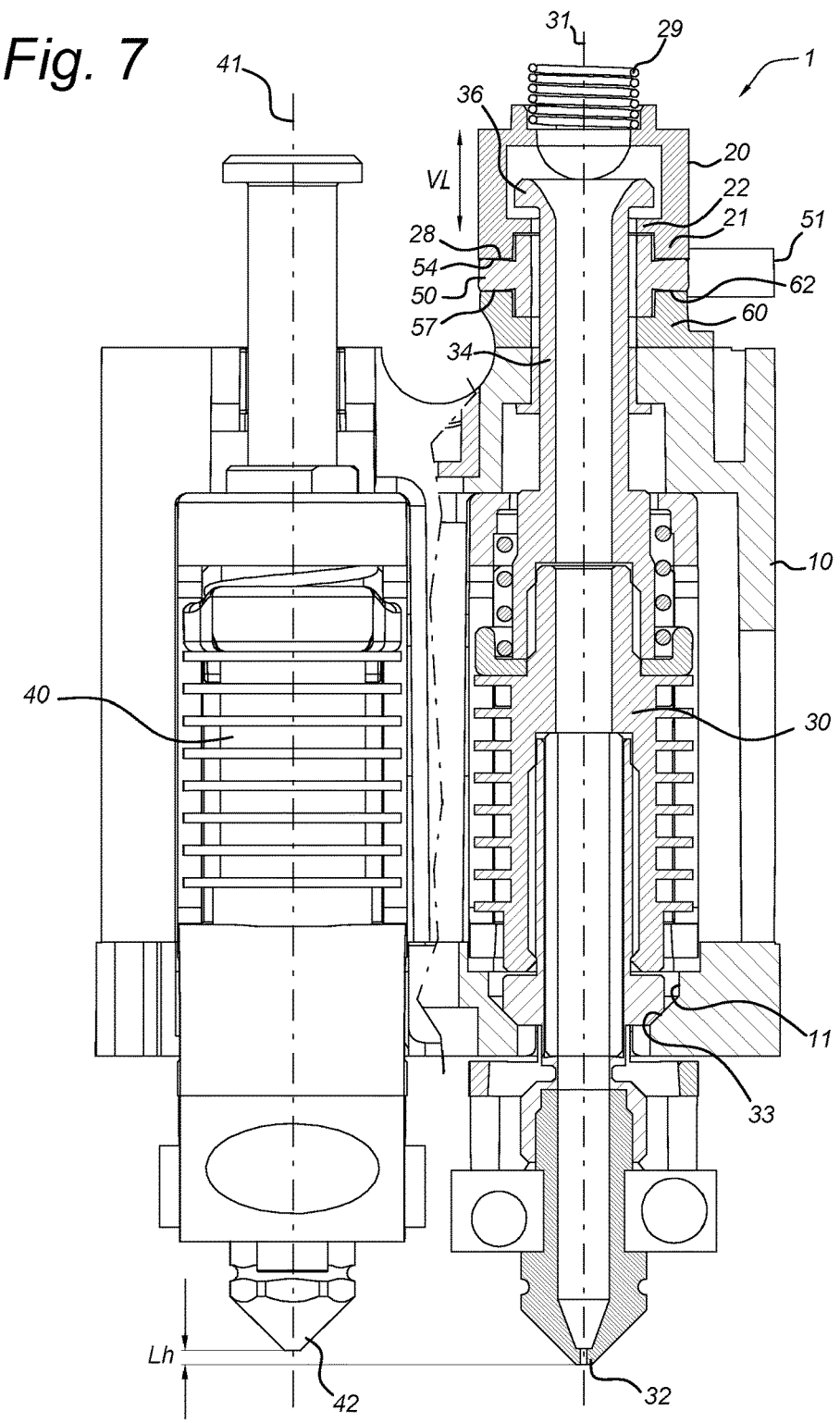
FIG. 7 shows a partial cross section of an alternative embodiment of the nozzle lifting assembly in a lowered position according to the present invention.
Figure 8:
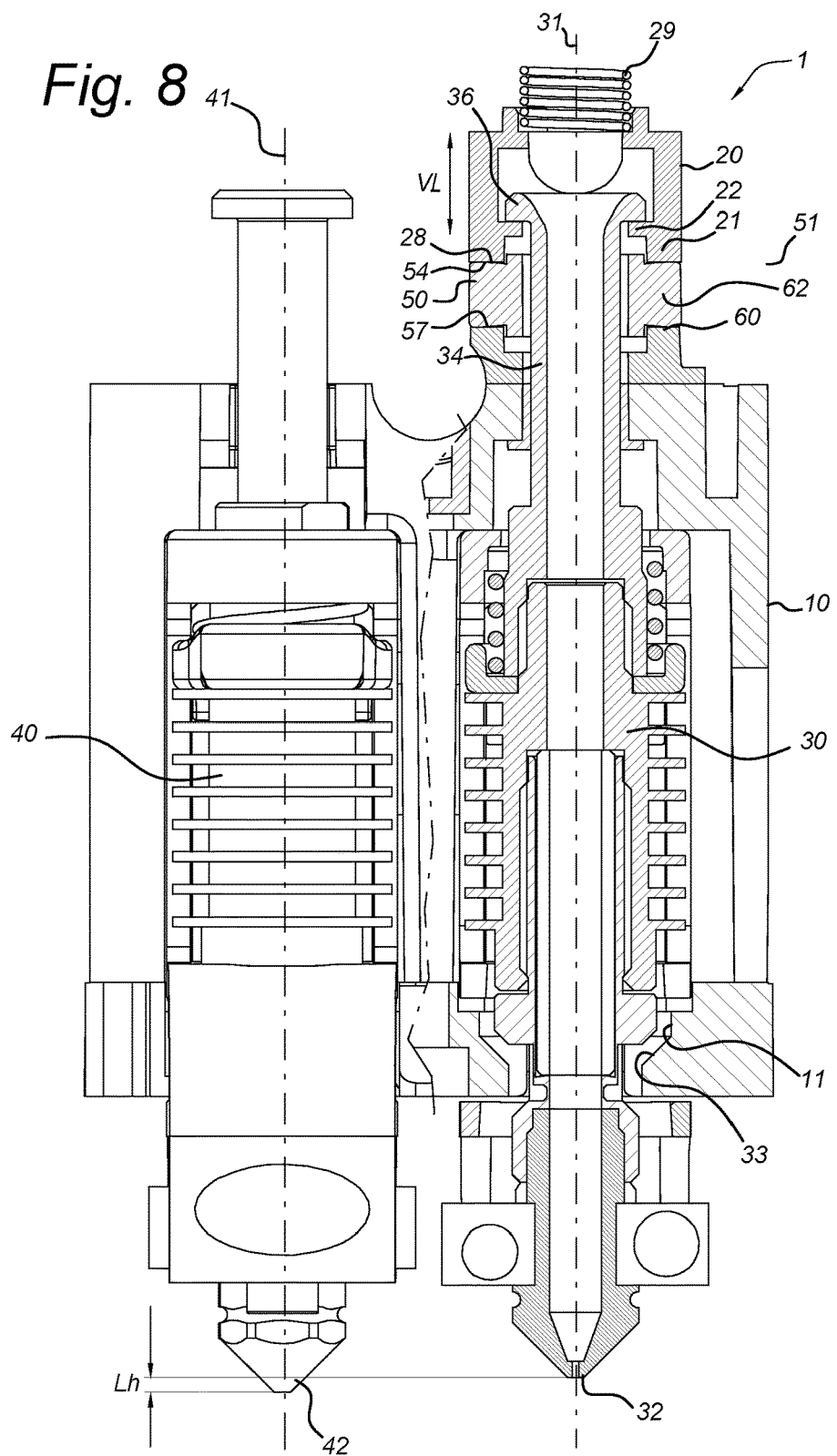
FIG. 8 shows a partial cross section of an alternative embodiment of the nozzle lifting assembly in a lifted position according to the present invention.

FIGS. 7 and 8 each show a partial cross section of an alternative embodiment of the nozzle lifting assembly 1 in a lowered position and a lifted position, respectively. In the embodiments shown, the lift member 20 is movably arranged with respect to the base member 10 in a vertical direction $V_L$ as indicated by the double arrow, wherein the first nozzle body 30 is arranged for being lifted by the lift member 20.

Note that in contrast to the embodiments shown in FIGS. 1 to 6, the lift member 20 as discussed below in light of in de FIGS. 7 to 11 is not in rational engagement with the base member 10 but is linearly moveable in the vertical direction $V_L$ only.

In comparable fashion with the previous embodiments, the first nozzle body 30 may comprise a conical section 33 extending through a base member hole 11 of the base member 10, wherein the conical section 33 of the first nozzle body 30 is in circumferential contact engagement with the base member hole 11. This ensures accurate lateral alignment of the first nozzle body 30.

The second nozzle body 40 is stationary in vertical direction with respect to the base member 10 during an additive manufacturing process. In an embodiment the lift member 20 comprises a first end 21 in wedging engagement with the wedge member 50 and a second end 22 which is in contact engagement with the first nozzle body 30. As depicted, the contact engagement may be obtained through the second end 22 of the lift member 20, wherein the second end 22 may be envisaged as in inwardly protruding rim or ridge 22 arranged along a circumference of the lift member 20 and encircling, at least in part, an inlet end 34 of the first nozzle body 30. The inlet end 34 may be provided with an outwardly protruding flange 36 having a larger diameter than a diameter of the protruding rim 22, so that the flange 36 latches against the rim or ridge 22 as the lift member 20 is in a lifted position in the vertical direction $V_L$. As shown in FIG. 8, the second end 22, e.g. the rim or ridge 22, contacts the flange 36 when the lift member 20 is in the lifted positioned corresponding to the second wedge position, wherein the extrusion outlet 32 of the first nozzle body 30 extends above the extrusion outlet 42 of the second nozzle body 40 at a positional or height difference Lh. As already discussed above, in light of the invention the wedge member 50 is movably arranged relative to the base member 10 and in wedging engagement with the lift member 20 between a first and second wedge position, wherein the first and second wedge position correspond to a lowered position and a lifted position of the first nozzle body 30 with respect to the second nozzle body 40, respectively.

In the embodiments of FIGS. 7 and 8, the wedge member 50 may comprise a ramp section 54 in sliding engagement with the lift member 20, e.g. in sliding engagement with a ramp section 28 the lift member 20. The ramp section 54 of the wedge member 50 allows the lift member 20 and thus the first nozzle body 30 to be lowered and lifted in the vertical direction $V_L$ by the first and second wedge position of the wedge member 50 respectively. In an exemplary embodiment, the ramp section 54 of the wedge member 50 may comprise an upward projecting ramp section 54.

Figure 9:
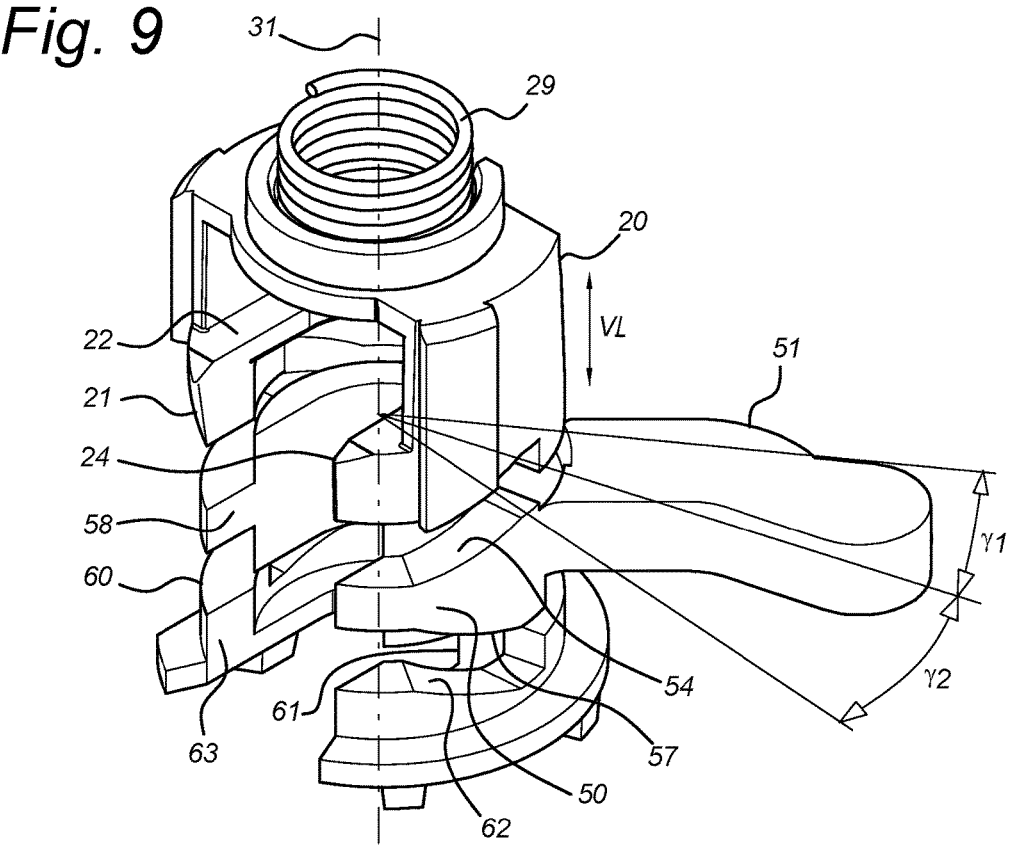
FIG. 9 shows an exploded view of an embodiment of a lift member and a wedge member as used in the present invention.
Figure 10:
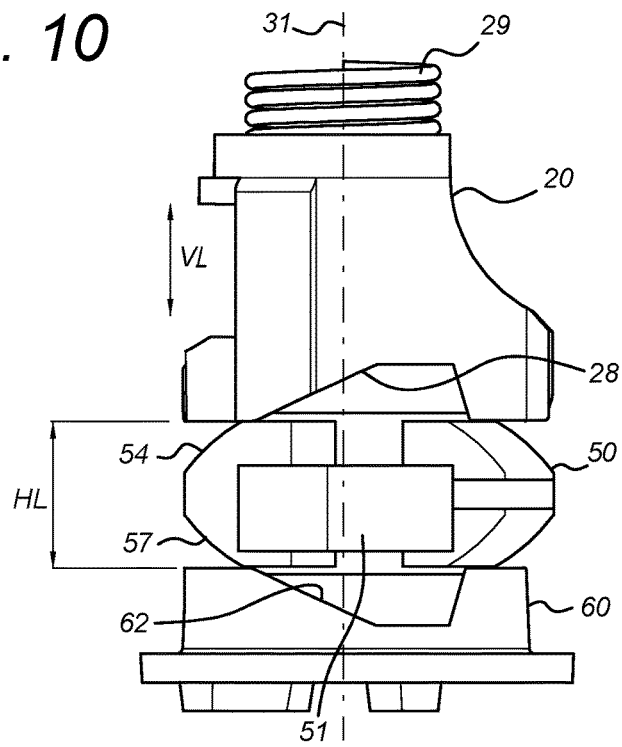
FIG. 10 shows a side view of an embodiment of a lift member and a wedge member in a second wedge position according to the present invention.

To further clarify on how the wedge member 50 allows for lowering and lifting the first nozzle body 30, reference is made to FIGS. 9 and 10. FIG. 9 shows an exploded view of an embodiment of a lift member 20 and a wedge member 50 as used in the present invention. FIG. 10 shows a side view of an embodiment of a lift member 20 and a wedge member 50 in a second wedging position according to the present invention.

As depicted in FIGS. 9 and 10, the wedge member 50 may comprise a ramp section 54 in sliding engagement with the lift member 20. In an embodiment, a ramp section 28 may also be provided to the lift member 20, so that the ramp section 54 of the wedge member 50 may be in sliding engagement congruent to the ramp section 28 of the lift member 20, thereby providing smooth sliding between the first and second wedge position with minimal friction forces.

In the embodiments shown, the wedge member 50 is rotationally arranged with respect to the base member 10 between a first wedging angle γ1 and a second wedging angle γ2. The first wedging angle γ1 corresponds to the first wedge position and the second wedging angle γ2 corresponds to the second wedge position. As depicted, the first and second wedging angle γ1, γ2 may be measured from a virtual midpoint, so the first wedging angle γ1 may be taken in counter clockwise direction as shown and the second wedging angle γ2 may be taken in the clockwise direction as shown. For example, when the first and second wedging angle γ1, γ2 equals zero, then this may be considered as a wedge position of the wedge member 50 wherein the extrusion outlet 32 of the first nozzle body 30 is positioned at equal height with the extrusion outlet 42 of the second nozzle body 40.

The first wedging angle γ1 therefore corresponds to a lowered position of the first nozzle body 30 and the second wedging angle γ2 corresponds to a lifted ("raised") position. Note that since the lift member 20 is movable in the vertical direction $V_L$ only, the wedge member 50 is also rotationally arranged with respect to the lift member 20 between the first wedging angle γ1 and the second wedging angle γ2.

From a functional point of view, through a rotation around the longitudinal axis 31 from the first wedging angle γ1 toward the second wedging angle γ2, the ramp section 54 of the wedge member 50 wedges against the lift member 20 and raises or lifts the first nozzle body 30 in upward fashion along the vertical direction $V_L$. The first wedging angle γ1 and the second wedging angle γ2 may therefore define an angle range over which the wedge member 50 can be rotated to achieve desired lifting or lowering of the first nozzle body 30.

In an embodiment, the ramp section 54 can be configured to have a predetermined ramp angle or ramp incline determining a lifting height for the lift member 20 that can be obtained by the ramp section 54 of the wedge member 50 between the first and second wedging angles γ1, γ2.

In an advantageous embodiment, the wedge member 50 may also comprise a further ramp section 57 projecting in an opposite direction to the ramp section 54 of the wedge member 50 and in sliding engagement with the base member 10. This embodiment allows for an increased lifting height $H_L$ that would otherwise require a single ramp section 54 having a large ramp angle or ramp incline. However, having a large ramp angle or ramp incline may impose friction forces during sliding engagement that are too high and exceed predetermined values. So in case the wedge member 50 comprises two opposing ramp sections 54, 57, e.g. an upward projecting ramp section 54 and a downward projecting further ramp section 57, then an increased lifting height $H_L$ can be obtained for a given ramp angle or ramp incline.

In an advantageous embodiment, the wedge member 50 comprises a lever member 51 arranged for rotating the wedge member 50, thereby providing reliable actuation of the wedge member 50 for rotation over the first wedging angle γ1 or the second wedging angle γ2.

In the embodiments shown in FIGS. 7 to 10, the nozzle lifting assembly 1 may further comprise a resilient biasing member 29 connected to the lift member 20 and in downward biasing engagement therewith. The resilient biasing member 29 allows downward biasing of the lift member 20 along the vertical direction $V_L$. In an exemplary embodiment as depicted, the biasing member 29 may comprise a spring-like element continuously pushing the lift member 20 downward, and thus biasing the first nozzle body 30 downward. Moving the wedge member 50 from the first wedge position to the second wedge position will therefore store potential energy in the biasing member 29 when, e.g., the lever member 51 is moved from the first wedging angle γ1 to the second wedging angle γ2.

As further depicted in FIG. 9, the lift member 20 and the wedge member 50 may each comprise a side opening 24, 58 arranged for receiving the first nozzle body 30 such as an inlet end 34 thereof. In particular, the side opening 24 of the lift member 20 and the side opening 58 of the lift member 50 allow for easy placement and removal of the first nozzle body 30, wherein the inlet end 34 can be easily received within the lift member 20 and the wedge member 50 both of which enclose at least in part the inlet end 34 of the first nozzle body 30.

Figure 11:
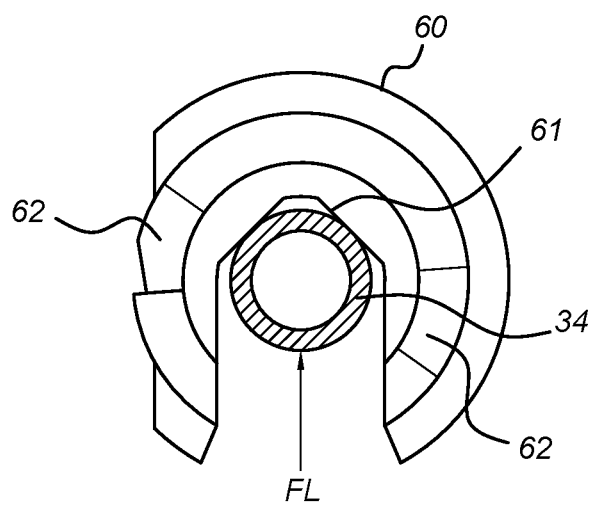
FIG. 11 shows a top view of an alternative embodiment of a lateral alignment member as used in the present invention.

In the embodiments of FIGS. 7 to 10, the nozzle lifting assembly 1 may further comprise a lateral alignment member 60 in sliding engagement with an inlet end 34 of the first nozzle body 30. FIG. 11 shows a top view of an embodiment of a lateral alignment member 60 according to the present invention.

In the embodiments shown, the lateral alignment member 60 may be arranged between the wedge member 50 and the base member 10. The lateral alignment member 60 may be fixedly mounted on the base member 10 so that the wedge member 50 is rotationally arranged with respect to the lateral alignment member 60 and in sliding engagement therewith. For lateral stability and lateral alignment accuracy, an embodiment is provided wherein the lateral alignment member 60 comprises a V-shaped recess 61. The V-shaped recess 61 allows point contact between the first nozzle boy 30, and the inlet end 34 thereof, and the lateral alignment member 60. The point contact minimizes friction forces when the first nozzle body 30 is lowered or lifted. Furthermore, the point contact also ensures that lateral positioning of the first nozzle body 30 and the inlet end 34 is accurate and reliable even under the influence of surface irregularities of the inlet end 34.

In an embodiment, to ensure that the inlet end 34 of the first nozzle body 30 is in point contact with the lateral alignment member 60, the nozzle lifting assembly 1 may further comprise a positioning unit (not shown) in contact engagement with the inlet end 34, wherein the positioning unit is configured to provide a lateral positioning force FL onto the inlet end 34. The lateral positioning force FL thus provides a lateral biasing force pushing the inlet end 34 against the lateral alignment member 60, in particular the V-shaped recess 61.

Comparable to the lift member 20 and the wedge member 50, in an advantageous embodiment the lateral alignment member 60 may be provided with a side opening 63 arranged for receiving the inlet end 34 of the first nozzle body 30. The side opening 63 of the lateral alignment member 60 allows for easy placement and removal of the first nozzle body 30, wherein the inlet end 34 can be easily received within the lateral alignment member 60 which encloses, at least in part, the inlet end 34 of the first nozzle body 30.

As discussed above, the wedge member 50 may comprise a further ramp section 57 in sliding engagement with the base member 10. In an embodiment, the further ramp section 57 may project in opposite direction to the ramp section 54 of the wedge member 50. In an exemplary embodiment, see FIG. 10, the ramp section 54 of the wedge member 50 may comprise an upward projecting ramp section 54 and the further ramp section 57 may comprise a downward projecting ramp section 57. Both ramp sections 54, 57 may have identical ramp angles or ramp inclines but this need not be the case.

The ramp section 54 and further ramp section 57 of the wedge member 50 provide an increased lifting height $H_L$ for a given ramp angle or ramp incline. For example, in case the wedge member 50 merely comprises a single ramp section 54, then in order to achieve the increased lifting height $H_L$ it may be required that the single ramp section 54 has a relatively steep ramp incline, which may increase friction forces beyond acceptable values. Therefore, having two opposing ramp sections 54, 57 allows the increased lifting height $H_L$ to be possible for moderate ramp angles or ramp inclines without increasing friction forces excessively.

In an advantageous embodiment the wedge member 50 may also comprise a further ramp section 57 in sliding engagement with a ramp section 62 of the lateral alignment member 60. For example, in an embodiment the wedge member 50 may comprise a downward projecting ramp section 57 in sliding engagement with a ramp section 62 of the lateral alignment member 60. In an embodiment the ramp section 62 of the lateral alignment member 60 may also comprise a downward projecting ramp section 62 that is congruent to a downward projecting further ramp section 57 of the wedge member 50.

Note that the terms "upward projecting" and "downward projecting" may be associated with a positive and negative slope, respectively, when going in a direction from left to right in FIG. 10. That is, the ramp section 28 of the lift member 20 and the ramp section 54 of the wedge member 50 may be considered to comprise a positive slope (going "upward") when reading from left to right. Conversely, the further ramp section 57 of the wedge member 50 and the ramp section of the lateral alignment member 60 may be considered to comprise a negative slope (going "downward") when reading from left to right in FIG. 10.

In light of the invention is can be argued that during an additive manufacturing process the first nozzle body 30 may be lowered and lifted many times. To keep wear of the lift member 20, the wedge member 50, and/or the lateral alignment member 60 to a minimum, the lift member 20, the wedge member 50 and/or the lateral alignment member 60 may advantageously comprise a plastic material, such as a self-lubricating plastic material. The plastic material reduces friction forces between the various ramp sections 28, 54, 57, 62 of the lift member 20, wedge member 50 and/or the lateral alignment member 60, so that wear of the various ramp sections 28, 54, 57, 62 is minimized.

The present invention embodiments have been described above with reference to a number of exemplary embodiments as shown in and described with reference to the drawings. Modifications and alternative implementations of some parts or elements are possible, and are included in the scope of protection. In addition, many modifications may be made to adapt a particular situation or material to the teachings of the invention without departing from the essential scope thereof. Therefore, it is intended that the invention not be limited to the particular embodiments disclosed, but that the invention will include all embodiments falling within the scope of the appended claims.

The invention claimed is:

1. A nozzle lifting assembly for an additive manufacturing system, the nozzle lifting assembly comprising:
    a base member and a lift member configured to move with respect to the base member,
    a first nozzle body arranged for being lifted by the lift member and a second nozzle body disposed on the base member, and
    a wedge member arranged on the base member, configured to rotate between a first and second wedge position, and in wedging engagement with the lift member such that the lift member allows the first nozzle body to move to a lowered position with respect to the second nozzle body when the wedge member rotates to the first wedge position and lifts the first nozzle body to a lifted position with respect to the second nozzle body when the wedge member rotates to the second wedge position.

2. The nozzle lifting assembly of claim 1, wherein an extrusion outlet of the first nozzle body is positioned lower than an extrusion outlet of the second nozzle body in the first wedge position, and wherein
    the extrusion outlet of the first nozzle body is positioned higher than the extrusion outlet of the second nozzle body in the second wedge position.

3. The nozzle lifting assembly of claim 1, wherein the lift member comprises a first end in wedging engagement with the wedge member and a second end in contact engagement with the first nozzle body.

4. The nozzle lifting assembly of claim 1, wherein the first nozzle body comprises a conical section extending through a base member hole of the base member, wherein the conical section of the first nozzle body is in circumferential contact engagement with the base member hole.

5. The nozzle lifting assembly of claim 1, wherein the wedge member is rotationally arranged with respect to the base member between a first wedging angle and a second wedging angle, wherein the first wedging angle corresponds to the first wedge position and the second wedging angle corresponds to the second wedge position.

6. The nozzle lifting assembly of claim 1, wherein the wedge member comprises a ramp section in sliding engagement with the lift member.

7. The nozzle lifting assembly of claim 1, wherein the wedge member comprises a ramp section in sliding engagement with a ramp section of the lift member.

8. The nozzle lifting assembly of claim 7, wherein the wedge member comprises a further ramp section projecting in opposite direction to the ramp section of the wedge member and in sliding engagement with the base member.

9. The nozzle lifting assembly of claim 1, wherein the wedge member comprises a lever member arranged for rotating the wedge member.

10. The nozzle lifting assembly of claim 1, further comprising a resilient biasing member connected to the lift member and in downward biasing engagement therewith.

11. The nozzle lifting assembly of claim 1, wherein the lift member and the wedge member each comprise a side opening arranged for receiving an inlet end of the first nozzle body.

12. The nozzle lifting assembly of claim 1, further comprising a lateral alignment member in sliding engagement with an inlet end of the first nozzle body.

13. The nozzle lifting assembly of claim 12, wherein the wedge member comprises a further ramp section in sliding engagement with a ramp section of the lateral alignment member.

14. The nozzle lifting assembly of claim 12, wherein the lateral alignment member comprises a v-shaped recess.

15. The nozzle lifting assembly of claim 1, further comprising a positioning unit in contact engagement with an inlet end of the first nozzle body, the positioning unit being configured to provide a lateral positioning force onto the inlet end of the first nozzle body.

* * * * *